C. S. VAN HORN.
FOLDING FISH LANDING NET.
APPLICATION FILED DEC. 19, 1916.
1,240,787.
Patented Sept. 18, 1917.
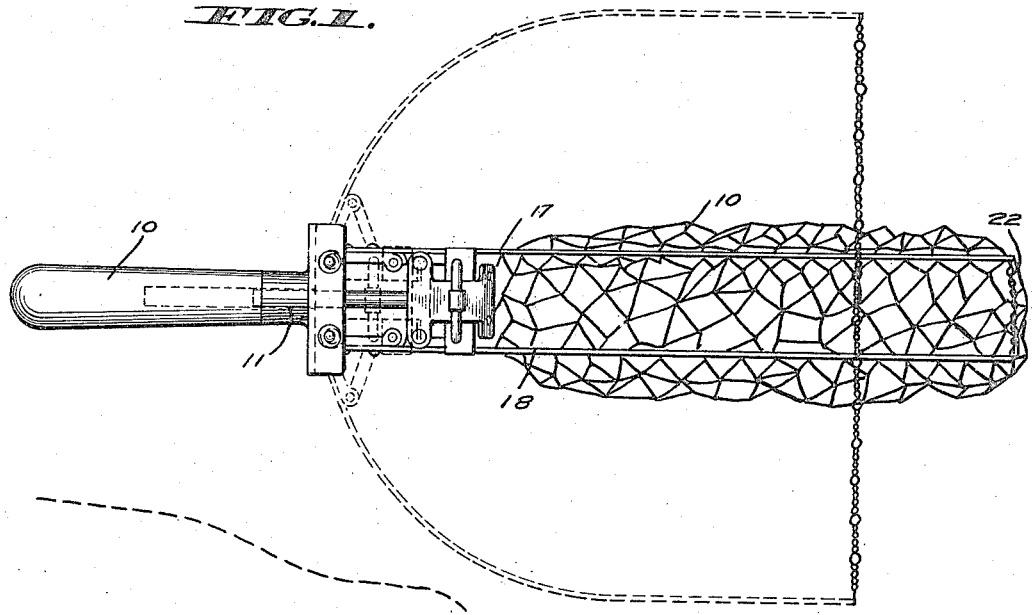
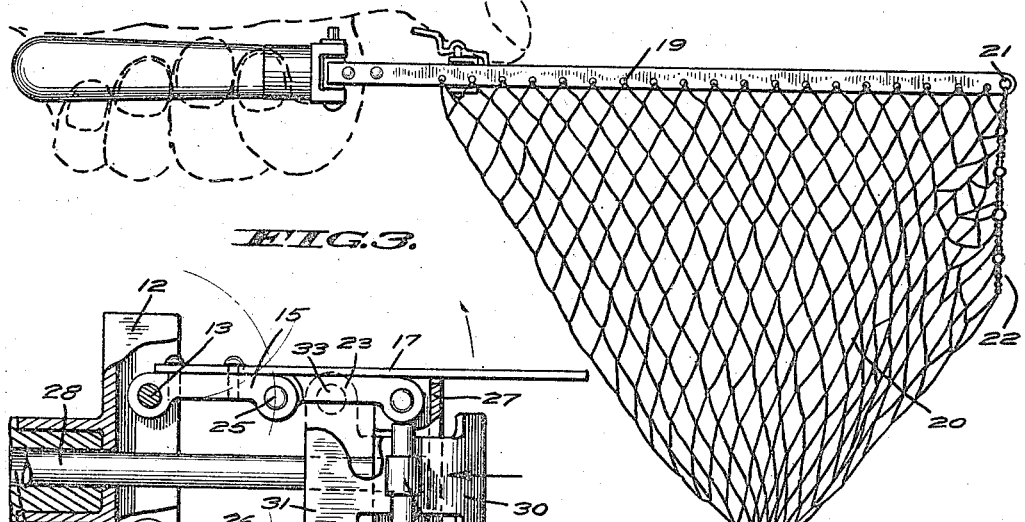
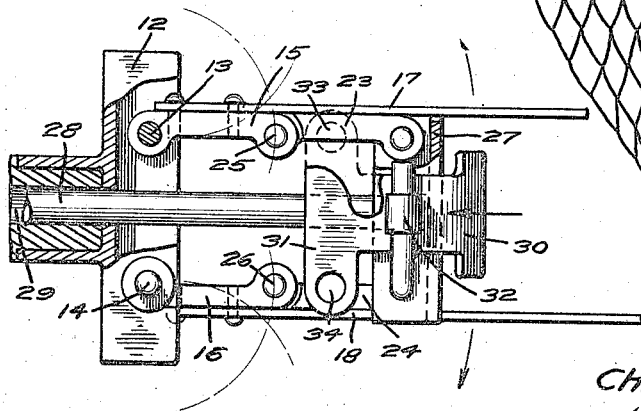
INVENTOR
CHARLES S. VAN HORN
BY Hazard & Miller
ATTYS

UNITED STATES PATENT OFFICE.

CHARLES S. VAN HORN, OF LOS ANGELES, CALIFORNIA, ASSIGNOR OF ONE-HALF TO HARRY R. WHITAKER, OF LOS ANGELES, CALIFORNIA.

FOLDING FISH-LANDING NET.

1,240,787.         Specification of Letters Patent.         Patented Sept. 18, 1917.

Application filed December 19, 1916.   Serial No. 137,834.

*To all whom it may concern:*

Be it known that I, CHARLES S. VAN HORN, a citizen of the United States, residing at Los Angeles, in the county of Los Angeles and State of California, have invented new and useful Improvements in Folding Fish-Landing Nets, of which the following is a specification.

This invention relates to a trout net and particularly pertains to the construction of a foldable fish landing net.

It is the principal object of this invention to provide a landing net to be used while fishing and which is so constructed as to be easily carried in a folded condition and to be readily opened when desired.

Another object of this invention is to provide a locking means which will act simultaneously with the movement of the operator to open the net and which is so constructed as to be readily released in case it is desired to close the net in an effort to trap a fish therein.

Another object of this invention is to provide a net of the above construction which may be manipulated with one hand and opened or closed easily and readily without other assistance.

It is a further object of this invention to provide a fish landing net which is formed of few operative parts so constructed and designed as not to be readily broken or become otherwise inoperative.

Other objects will appear hereinafter.

The invention is illustrated, by way of example, in the accompanying drawings in which:

Figure 1 is a view in plan elevation illustrating the net in its folded position and further discloses, by a dotted line, the opened position of the net.

Fig. 2 is a view in side elevation illustrating the net as closed and showing the manner in which it is grasped by the hand of the operator to be brought to an opened and locked position.

Fig. 3 is a view in elevation and section as seen in plan and as illustrating the actuating and locking mechanism provided by the net.

Referring more particularly to the drawings, 10 indicates a handle which is designed of a length to readily permit it to be grasped by the hand and is not formed with a long extension, as most trout landing nets are constructed. This handle is fitted with a ferrule 11 which is provided with a lateral channel bracket 12. This bracket is adapted to receive pivot pins 13 and 14 which are positioned upon opposite sides of the longitudinal center of the handle and afford mountings for stay links 15 and 16. These links are provided as a mounting to which the net stays 17 and 18 are fixed. These stays are flexible strips of steel and are formed with a series of perforations 19 along their lower edge through which the strands of net 20 are looped. The outer ends of the stays are provided with enlarged perforations 21 adapted to afford a mounting for end of chain 22, by which the expansive movement of the stays is limited when the device is in its opened position.

The stays are adapted to be spread in relation to each other by means of spreading links 23 and 24 which are pivoted to the outer ends of the links 15 and 16 by means of pivot pins 25 and 26. The outer ends of the spreading links are pivoted upon suitable pivot pins within a spreading channel member 27 which is positioned between the stays and is of a width to permit the stays and links to lie parallel to each other when the net is in its closed condition. Extensions are formed upon the upper and lower walls of the channel member to confine it upon the stays and permit it to slide therealong. It will be evident that as the channel slides toward the handle the stays will be operated to the toggle motion of the stays and spreading links. In order to cause the net to spread properly a centering rod 28 is provided and fixed to the center of the channel member 27 from which point it extends rearwardly into a bore 29 formed throughout a portion of the length of the handle and in which it may reciprocate.

Pressure is exerted upon a thumb piece 30 to open the net, this piece being pivotally mounted upon the channel member 27 and extending with the thumb piece forwardly therefrom. The thumb piece is provided with a locking plate 31 which extends rearwardly of the pivotal mounting 32 upon the channel and is formed with lock openings 33 and 34 which are adapted to be brought to register with upwardly extending ends upon the pins 13 and 14, previously described as being mounted within the ferrule bracket 12.

In operation the handle 10 is firmly grasped in either hand and the thumb of the hand is placed over the thumb piece 30. When it is desired to open the net the thumb may be quickly drawn toward the handle. This will exert pressure upon the thumb piece and the channel member 27 simultaneously, and will cause the locking plate 31 to swing upwardly and the link members adjacent each of the stays to swing outwardly as indicated in a dotted line position on Fig. 1. This action will force the stays outwardly from each other equi-distant from the longitudinal center of the net. Their outward movement, however, will be limited by the chain 22 which will hold the ends and permit the rear portion of the stays to become bowed. When the channel member 27 has moved to the limit of its rearward movement, the locking openings 33 and 34 upon the plate 31 will be directly over the upward extensions of the pins 13 and 14 and a slight movement of the thumb will cause these pins and holes to register in a manner to lock the net in its open position. When it is desired to close the net slight pressure is exerted upon the thumb piece 30 to swing the plate 31 out of engagement with the pins 13 and 14 and thereafter the resiliency of the stays 17 and 18 will be sufficient to draw the entire mechanism to its normal folded condition.

It will thus be seen that the net here disclosed may be compactly folded and easily carried and that it may be instantly actuated at the will of the operator to be either closed or opened and thereafter will be automatically maintained in the desired position without further attention.

While I have shown the preferred construction of my foldable fish landing net as now known to me, it will be understood that various changes in the combination, construction and arrangement of parts may be made by those skilled in the art without departing from the spirit of my invention.

I claim:

1. A folding fish landing net comprising a handle, a lateral channel bracket extending forwardly from the handle, stay links pivotally mounted in the channel of the bracket and extending forwardly, spring net stays secured to the stay links, a net secured to the stays, spreading links connected to the forward ends of the stay links, a spreading channel member mounted between the stays and connected to the forward ends of the spreading links, a centering rod extending from the spreading channel member slidingly into the handle, and a thumb-piece pivotally mounted upon the spreading channel member and adapted to lock with the lateral channel bracket.

2. In a landing net, a handle, net stays pivotally connected to the handle, a spreading member between the stays and connected to the stays by toggle-joints, a centering rod extending from the spreading member slidingly into the handle, and locking mechanism carried by the spreading member and adapted to be manipulated by a thumb and adapted to lock with the handle mechanism.

In testimony whereof I have signed my name to this specification.

CHAS. S. VAN HORN.

Copies of this patent may be obtained for five cents each, by addressing the "Commissioner of Patents, Washington, D. C."